(12) United States Patent
Nishikawa

(10) Patent No.: US 8,867,074 B2
(45) Date of Patent: Oct. 21, 2014

(54) IMAGE FORMING APPARATUS, FIRMWARE UPDATING METHOD, AND PROGRAM USING CONFIRMATION TIME AND APPLICATION TIME

(75) Inventor: Satoshi Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 480 days.

(21) Appl. No.: 13/226,895

(22) Filed: Sep. 7, 2011

(65) Prior Publication Data

US 2012/0062948 A1   Mar. 15, 2012

(30) Foreign Application Priority Data

Sep. 13, 2010   (JP) ................................ 2010-204069

(51) Int. Cl.
 *G06F 3/12* (2006.01)
 *H04N 1/00* (2006.01)
(52) U.S. Cl.
 CPC ............ *G06F 3/1288* (2013.01); *G06F 3/1203* (2013.01); *H04N 1/00244* (2013.01); *G06F 3/123* (2013.01); *H04N 1/00222* (2013.01); *H04N 1/00408* (2013.01)
 USPC .......................... 358/1.15; 717/173; 717/168
(58) Field of Classification Search
 CPC ........................... G06F 3/123; H04N 1/00244
 USPC .................. 358/1.15; 717/173, 168
 See application file for complete search history.

(56) References Cited

U.S. PATENT DOCUMENTS

| | | | | |
|---|---|---|---|---|
| 7,913,246 | B2* | 3/2011 | Hammond et al. | 717/173 |
| 2004/0145766 | A1* | 7/2004 | Sugishita et al. | 358/1.13 |
| 2004/0148379 | A1* | 7/2004 | Ogura | 709/223 |
| 2006/0274358 | A1* | 12/2006 | Fukui et al. | 358/1.15 |
| 2007/0055970 | A1* | 3/2007 | Sakuda et al. | 717/168 |
| 2008/0127159 | A1* | 5/2008 | Regenmorter | 717/168 |
| 2008/0148268 | A1* | 6/2008 | Hirouchi | 718/103 |
| 2009/0146980 | A1* | 6/2009 | Nishikawa | 345/205 |
| 2009/0150878 | A1* | 6/2009 | Pathak et al. | 717/172 |
| 2009/0177806 | A1* | 7/2009 | Nishikawa | 710/10 |
| 2009/0187900 | A1* | 7/2009 | Nakamoto | 717/168 |
| 2009/0219568 | A1* | 9/2009 | Machida | 358/1.15 |
| 2009/0251730 | A1* | 10/2009 | Yamaguchi | 358/1.15 |
| 2010/0079793 | A1* | 4/2010 | Nishikawa | 358/1.15 |
| 2010/0082847 | A1* | 4/2010 | Yasui | 710/15 |

FOREIGN PATENT DOCUMENTS

| | | |
|---|---|---|
| JP | 10-091453 A | 4/1998 |
| JP | 2006-072761 A | 3/2006 |

\* cited by examiner

*Primary Examiner* — Jeremiah Bryar
*Assistant Examiner* — Quyen V Ngo
(74) *Attorney, Agent, or Firm* — Canon USA, Inc. IP Division

(57) ABSTRACT

A confirmation time at which confirmation processing for confirming whether firmware applicable to an image forming apparatus is managed by a delivery server and an application time at which the firmware is applied to the image forming apparatus are set in advance by an operation unit of the image forming apparatus, and an update control unit performs the confirmation processing at an actual confirmation time which is acquired by shifting the confirmation time, and if firmware applicable to the image forming apparatus is managed by the delivery server, the firmware is downloaded from the delivery server, and the firmware is stored in a storage device, and the update control unit applies the stored firmware to the image forming apparatus at the application time.

13 Claims, 15 Drawing Sheets

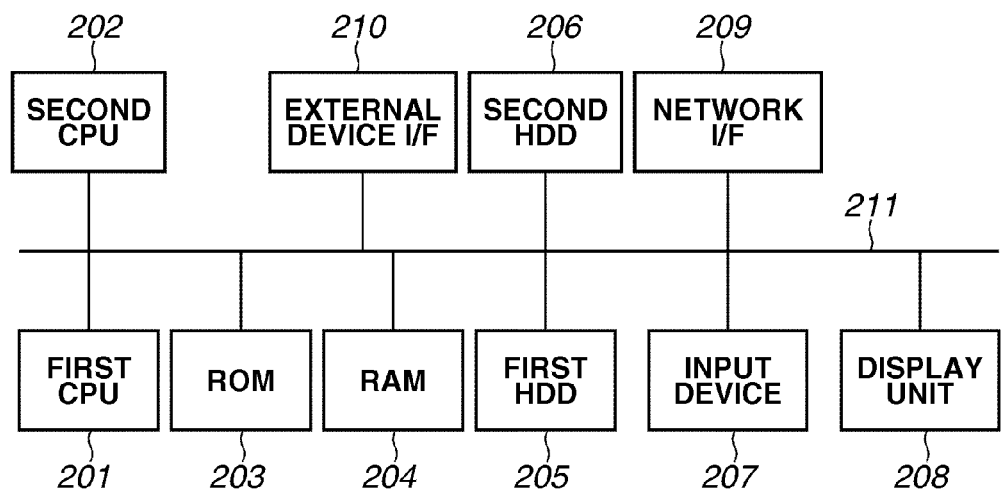
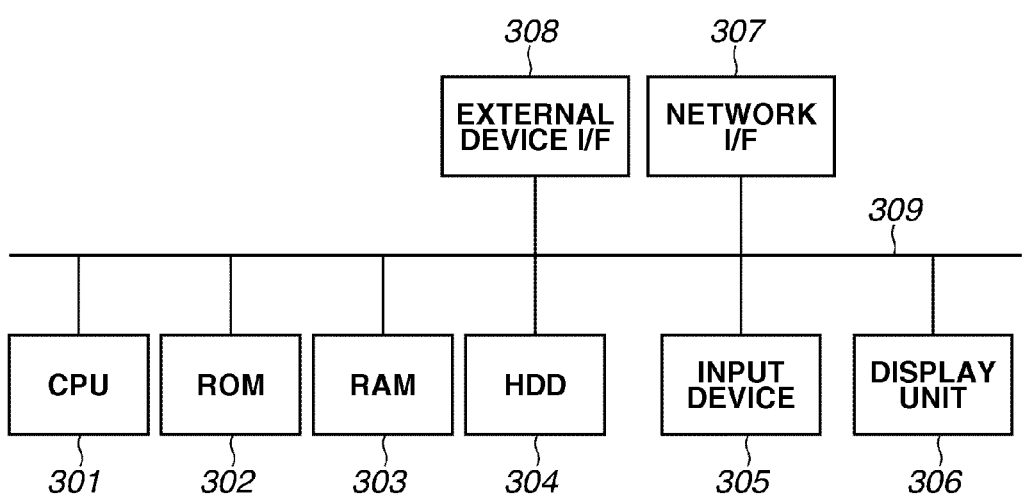

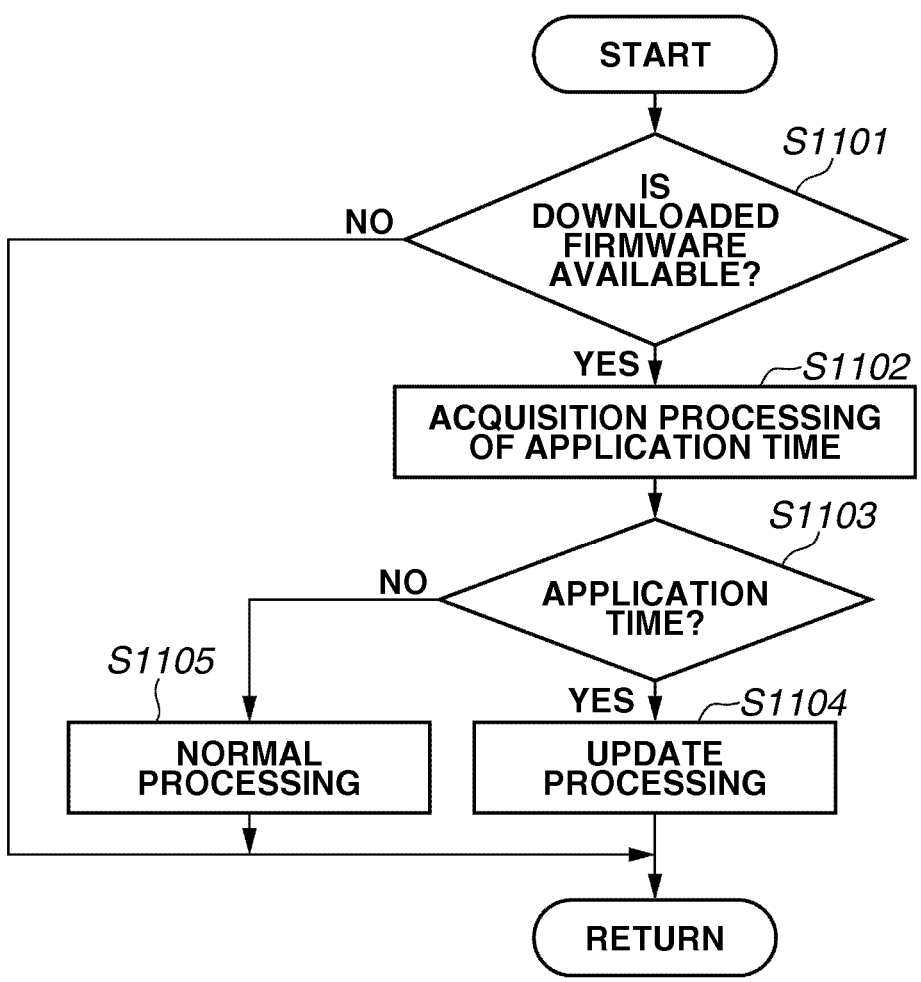

FIG.15

- DEVICE ID
- CURRENT FIRMWARE COMPONENT INFORMATION LIST
  - FIRMWARE TYPE
  - FIRMWARE VERSION
- INFORMATION TO BE ACQUIRED
  - ACQUISITION TYPE (WHOLE/SPECIFIED/LATEST)
  - ADDITIONAL SET ACQUISITION MODE (ALL/ESSENTIAL)
  - SPECIFIC FIRMWARE ACQUISITION INFORMATION
    - ID
    - PASSWORD
  - OPERATOR CLASSIFICATION (SERVICE PERSON/USER/PERIODIC UPDATE)

- COUNTRY INFORMATION
    - LANGUAGE CODE
    - COUNTRY CODE
  - AREA CODE OF AREA WHERE DEVICE IS LOCATED

- FIRMWARE INFORMATION LIST
  - BASIC SET INFORMATION
  - BASIC SET ID
  - FIRMWARE GROUP VERSION
  - FIRMWARE LABEL

IMAGE FORMING APPARATUS, FIRMWARE UPDATING METHOD, AND PROGRAM USING CONFIRMATION TIME AND APPLICATION TIME

BACKGROUND OF THE INVENTION

1. Field of the Invention

Embodiments of the present invention relate to a technique for updating firmware of an image forming apparatus.

2. Description of the Related Art

Conventionally, a monitoring system that may remotely monitor an operation state of an image forming apparatus, such as a printer or a multifunction peripheral, is used. In an environment of such a monitoring system, update of firmware of the image forming apparatus is performed in a manner described below.

Conventionally, if updating of firmware becomes necessary for reasons such as version upgrade or failure, a service person visits the customer's site and manually updates the firmware. Accordingly, the updating has been performed at a high cost.

Thus, recently, a technique for updating firmware by storing the firmware in a rewritable storage device such as a flash memory and transmitting the firmware via the Internet has been developed.

In connection with this, a system using such a technique has been proposed. According to such a system, reservation may be performed from the monitoring system described above, that performs remote monitoring. Further, an image forming apparatus in the system may access a server at regular intervals and confirm whether latest applicable firmware is present in the server.

Further, Japanese Patent Application Laid-Open No. 2006-072761 discusses a technique used for a portable electronic device that updates firmware according to communication with an update server via a communication line. According to this technique, the portable electronic device automatically accesses the above-described update server at predetermined timing and transmits a signal requesting update of firmware. Since the portable electronic device includes a reception unit, the portable electronic device receives the firmware which is transmitted from the update server in response to the request signal. If the voltage of the battery power is lower than a predetermined value, the reception of the firmware is cancelled.

Further, Japanese Patent Application Laid-Open No. 10-091453 discusses a system that updates software used by an apparatus according to update information included in a user's electronic mail.

Regarding a system where an image forming apparatus accesses a server at regular intervals and confirms whether latest applicable firmware is present, the firmware confirmation time is input from the image forming apparatus. However, if a plurality of image forming apparatuses is included in the system, normally, the confirmation time is set to the same time and the server will be heavily loaded at that time.

Further, if the server has firmware to be applied, the firmware may be updated at a time not convenient for the user.

SUMMARY OF THE INVENTION

One disclosed aspect of the embodiments is directed to an apparatus, a method, and a program for reducing a load concerning communication with a server by uniformly setting a time for a plurality of apparatuses by a simple and coordinated operation, and thus special management on the device management side is unnecessary, and the device management load may be reduced.

According to an aspect of the present invention, an update control unit is located in an image forming apparatus which may communicate with a server that controls delivery of firmware to a plurality of apparatuses. The update control unit includes a setting unit configured to set a confirmation time at which processing for confirming whether firmware applicable to the image forming apparatus is managed by the server and an application time at which firmware applicable to the image forming apparatus is applied to the image forming apparatus, a confirmation unit configured to perform the confirmation processing at an actual confirmation time shifted from the confirmation time which has been set, a download unit configured to, if the confirmation unit confirms that firmware applicable to the image forming apparatus is managed by the server, download the applicable firmware, a storage unit configured to store the firmware downloaded by the download unit, and an application unit configured to apply the firmware stored in the storage unit to the image forming apparatus at the application time which has been set.

Further features of the embodiments will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram illustrating an example of a hardware configuration of a monitoring center host computer.

FIG. 3 is a block diagram illustrating an example of a hardware configuration of a monitoring apparatus.

FIG. 14 is a flowchart illustrating an example of update processing according to one embodiment.

FIG. 15 illustrates an example of SOAP data transmitted from the image forming apparatus to the delivery server.

DESCRIPTION OF THE EMBODIMENTS

Various exemplary embodiments, features, and aspects of the invention will be described in detail below with reference to the drawings.

One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

Figure 1:
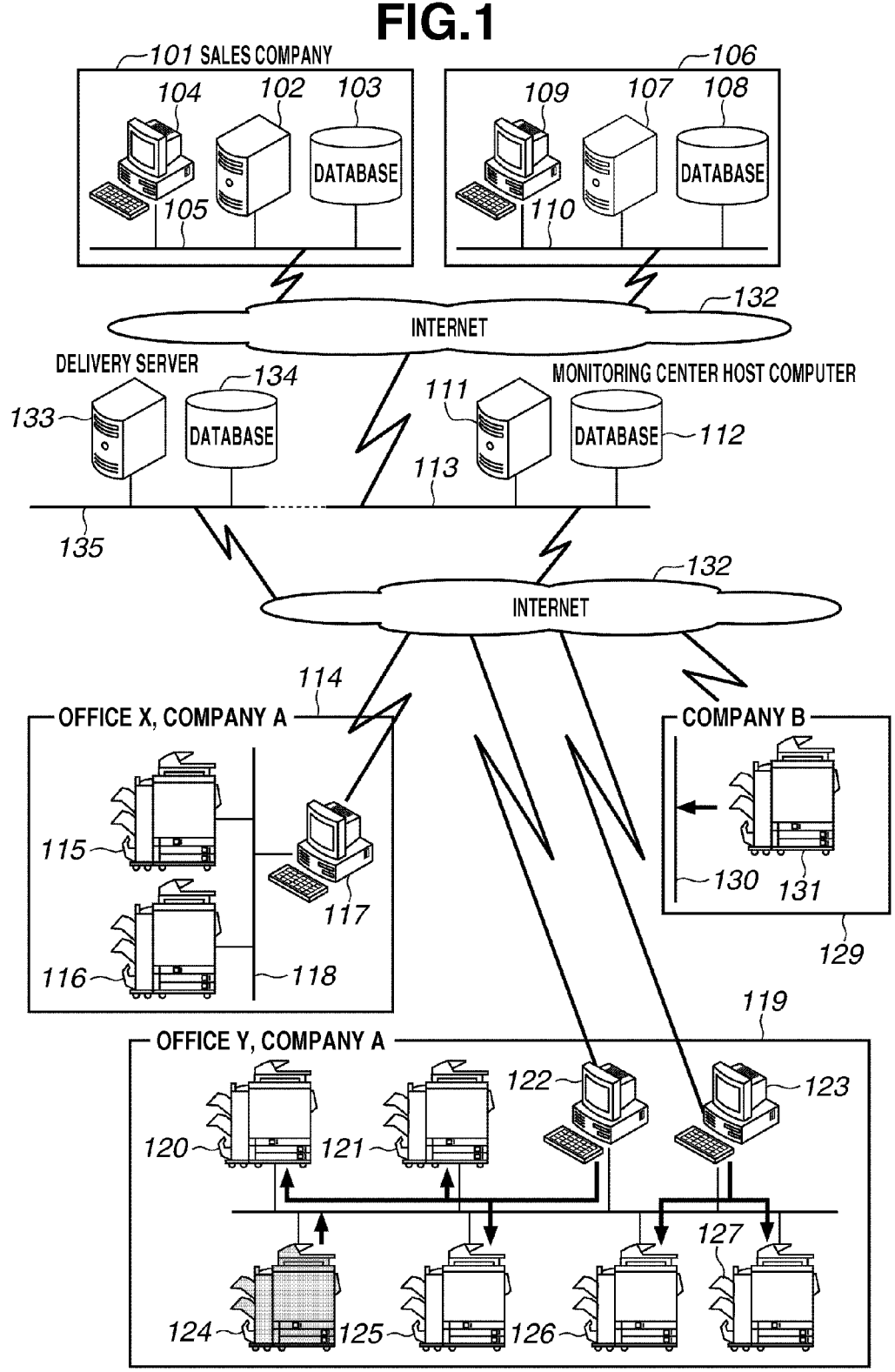
FIG. 1 illustrates an overall configuration of a management system according to an exemplary embodiment of the present invention.

FIG. 1 illustrates an overall configuration of a management system according to an exemplary embodiment of the present invention. As illustrated in FIG. 1, a sales company includes a plurality of systems connected to the management system. The systems are, for example, a system 101 and a system 106. The systems 101 and 106 of the sales company include databases 103 and 108, respectively. The database is used for accumulating information of the corresponding region, sales information of the customers, and information of the management system.

Further, the systems 101 and 106 of the sales company include personal computers (PCs) 104 and 109, respectively. The PCs 104 and 109 perform registration and correction of data with respect to the databases 103 and 108. Each of the PCs 104 and 109 accesses a website provided by a monitoring center host computer 111 and performs browsing of data.

Each of host computers 102 and 107 includes an operation unit and a display unit. Thus, the computers may play a role of the PCs 104 and 109. The host computer 102, the database 103, and the PC 104 are connected via a local area network (LAN) 105. Further, the host computer 107, the database 108, and the PC 109 are connected via a LAN 110.

Further, in FIG. 1, although each system of the sales company includes a plurality of apparatuses, a plurality of apparatuses is not necessary so long as each of the functions described below is realized. For example, the databases 103 and 108 may be physically included in the host computers 102 and 107. Further, if the databases 103 and 108 may be accessed from the host computers 102 and 107 via the Internet 132, they may be set at different locations. In other words, the database may be included in a plurality of apparatuses or included in one apparatus.

Further, the monitoring center host computer 111 is provided between the sales company and the customer. A database 112 is a history storage device used for accumulating monitoring information, image forming apparatus counter information collected from the customer, failure history information, and failure pattern table. The monitoring center host computer 111 and the database 112 are connected via a LAN 113. The LAN 113 is connected to the Internet 132. The database 112 may be physically included in the monitoring center host computer 111. Further, if the database 112 is accessed from the monitoring center host computer 111 via the Internet 132, the database 112 may be set at a different location.

The monitoring center host computer 111 collects and accumulates information of an image forming apparatus as a monitoring subject as well as operation state information (including failure information). The monitoring center host computer 111 collects such information from the monitoring apparatuses 117, 122, or 123 or an image forming apparatus 131 described below. Further, the monitoring center host computer 111 processes the obtained information and outputs a warning. Additionally, the monitoring center host computer 111 delivers the information to, for example, the host computers 102 and 107 of the sales company.

The state information includes, for example, toner out, door open, drum replacement, no cartridge, cooling fan malfunction, defective substrate, document positioning glass plate contamination, no staples, and insufficient light quantity of paper feeding sensor. Further, the state information includes font memory over flow, rendering error, fixing device malfunction, counter error, two-sided unit malfunction, and paper jam. Counter information is information related to counters such as charge counter information, division counter information, paper size counter information, and component counter information. The charge counter information is related to charge objects of the sales company. The division counter information is related to aggregate calculation for each customer division. The paper size counter is related to aggregate calculation for each paper size. The component counter indicates a consumption status of a component of the image forming apparatus.

The charge counter presents a number of pages printed by the image forming apparatus and the division counter presents a number of printed pages for each division set by the customer. If, for example, the component is a drum, the component counter presents the number of rotations of the drum. If the component is a scanner lamp, the counter counts the time (second). Such information will be considered as operation information.

Further, each of the host computers 102 and 107 of the sales company may register information and monitoring settings of the image forming apparatuses, which are the monitoring subjects of the monitoring center host computer 111, in the monitoring center host computer 111.

The monitoring center host computer 111 may merge settings regarding an image forming apparatus, which is a monitoring subject and registered by each host computer of the sales company, and settings regarding monitoring. Then, the monitoring center host computer 111 collectively manages the obtained result. Further, the monitoring center host computer 111 may make settings regarding monitoring of the monitoring apparatuses 117, 122, and 123 as well as the image forming apparatus 131.

The service of the management system is provided based on an agreement between the sales company and the customer. Thus, only the image forming apparatus which the sales company determines as a monitoring subject based on the agreement is considered as the monitoring subject of the management system.

The monitoring center host computer 111 provides a PC connected via the Internet 132 with information which the monitoring center host computer 111 has processed or a web page used for browsing information which is accumulated in the database 112. The content of the information is classified into information for sales company, customer, and user. When user authentication is performed, the information is presented to the user according to the authority of the user. Further, some data in the information may be changed from the web page.

A delivery server 133 is provided between the sales company and the customer. A database 134 is a history storage device used for accumulating firmware information, which is used when the firmware is applied to the image forming apparatus, as well as application information and software license information. The delivery server 133 manages a program, such as the firmware, stored in the database. The delivery server 133 delivers the program to the image forming apparatus so that the firmware is applied to the image forming apparatus.

The delivery server 133 and the database 134 are connected via a LAN 135. The LAN 135 is connected to the Internet 132. The database 134 may be physically included in the delivery server 133. Further, if the database 134 is accessed from the delivery server 133 via the Internet 132, the database 134 may be set at a different location. The LAN 135 and the LAN 113 may be a same LAN. The database 134 and the database 112 may share data.

Although the management system in FIG. 1 includes only one monitoring center host computer 111 and one database 112, and further, one delivery server 133 and one database 134, actually, a plurality of monitoring center host computers and databases may be included in the management system for distributed processing. The plurality of monitoring center host computers and the databases collect information from many image forming apparatuses and monitoring apparatuses and also perform load sharing regarding firmware delivery.

Next, the system configuration on the customer's side will be described. The environments on the customer's side may include a plurality of different environments. In FIG. 1, the management system includes customer systems 114, 119, and 129.

In the customer system 114 (office X, company A), image forming apparatuses 115 and 116 are connected to a LAN 118 which is also connected to the Internet 132. The image forming apparatuses 115 and 116 are monitored by the monitoring apparatus 117. The monitoring apparatus 117 communicates with the monitoring center host computer 111 via the Internet 132.

Further, in the customer system 119 (office Y, company A), image forming apparatuses on a LAN 128 are managed by the monitoring apparatuses 122 and 123. In other words, image forming apparatuses 120, 121, 124, and 125 are managed by the monitoring apparatus 122 and image forming apparatuses 126 and 127 are managed by the monitoring apparatus 123.

The monitoring apparatuses 117, 122, and 123 are connected to a database (not illustrated). For example, the monitoring apparatus 117 accumulates information which has been collected from the image forming apparatuses 115 and 116, stores the process result of the accumulated data, and also stores the settings concerning monitoring of the image forming apparatuses in the database (not illustrated). This database is connected to the LAN 118 and may be arranged independently. Further, this database may be arranged in a different location if the database may be accessed by the monitoring apparatuses 117, 122, and 123 via the Internet 132. Further, each time the monitoring apparatus receives state information (e.g., occurrence of failure) of the image forming apparatus from the image forming apparatus, the monitoring apparatus transmits the state information to the monitoring center host computer 111.

Regarding the customer system 129 of corporation B, the image forming apparatus 131 is connected to a LAN 130 which is also connected to the Internet 132. The imaging forming apparatus 131 directly communicates with the monitoring center host computer 111 via the Internet 132. Thus, the image forming apparatus 131 may actively transmit information of itself (e.g., counter information and failure occurrence information) to the monitoring center host computer 111. A PC (not illustrated) including a web browser is also connected to the LAN 130. By using such a PC, a user may browse the web page provided by the monitoring center host computer 111 not only from the customer environment but via the Internet 132.

Regarding the communication of the management system of the above-described configuration, the following points (1) and (2) need to be considered. (1) HyperText Transfer Protocol (HTTP) and Simple Object Access Protocol (SOAP) may be used in the communication via the Internet. SOAP is a communication protocol based on XML (eXtended Markup Language) and used for a computer calling up data or a service of another computer. According to the example described below, SOAP communicates over HTTP. When communication is performed using SOAP, a SOAP message, which is an XML document with supplementary information, is exchanged. Thus, a computer that supports SOAP includes a SOAP message generation unit that generates a SOAP message and a SOAP message interpretation unit that interprets the SOAP message. According to the present embodiment, state information of the image forming apparatus is transmitted to the monitoring center host computer 111 by a SOAP message.

(2) Although each image forming apparatus of the corporation A communicates with the monitoring center host computer 111 via a monitoring apparatus in the above description, by changing the settings, the image forming apparatus may communicate with the monitoring center host computer 111 without using a monitoring apparatus, as is the case with the image forming apparatus 131 in the company B.

FIG. 2 is a block diagram illustrating an example of a hardware configuration of the monitoring center host computer 111. Further, the hardware configurations of the delivery server 133 and the host computers 102 and 107 are similar to the hardware configuration of the monitoring center host computer 111.

In FIG. 2, a first CPU 201 and a second CPU 202 perform processing of the monitoring center host computer 111. A ROM 203, which is not rewritable, stores programs and data related to the processing of the monitoring center host computer 111. A RAM 204 may electrically store temporary data related to the processing of the monitoring center host computer 111. The data in the RAM 204 is rewritable.

A first hard disk drive (HDD) 205 and a second HDD 206 store programs and data related to the processing of the monitoring center host computer 111, temporary data, information related to the image forming apparatuses as the monitoring subjects of the present invention, and information collected from the image forming apparatuses. For example, component counter information, charge counter information, and division counter information is stored in the first HDD 205 and the second HDD 206.

An input device 207 is a keyboard or a pointing device that accepts instructions input in the monitoring center host computer 111. A display unit 208 is, for example, a liquid crystal display. The display unit 208 displays an operation state of the monitoring center host computer 111 and information output from each program that runs on the apparatus.

A network I/F 209 is connected to a LAN and the Internet via a network and exchanges information with an external device. An external device I/F 210 is connected to an external storage device. The components 201 to 210 are connected by a system bus 211 and data is exchanged between the components.

FIG. 3 is a block diagram illustrating an example of a hardware configuration of each of the monitoring apparatuses 117, 122, and 123. Further, the hardware configurations of the PCs 104 and 109 are similar to the configuration illustrated in FIG. 3. In FIG. 3, a CPU 301 performs processing of the monitoring apparatus. A ROM 302, which is not rewritable, stores programs and data related to the processing of the monitoring apparatus. A RAM 303 may electrically store temporary data related to the processing of the monitoring apparatus. The data in the RAM 303 is rewritable.

The monitoring apparatuses 117, 122, and 123 store programs and data related to the processing performed by the monitoring apparatus, temporary data, information related to the image forming apparatus which is a monitoring target, and information collected from the image forming apparatuses in a HDD 304. The PCs 104 and 109 store a web browser in the HDD 304.

An input device 305 is a keyboard or a pointing device that accepts instructions input in the monitoring apparatus. A display unit 306 is, for example, a liquid crystal display. The display unit 306 displays an operation state of the monitoring apparatus and information output from each program that runs on the apparatus.

A network I/F 307 is connected to a LAN and the Internet via a network and exchanges information with an external device. An external device I/F 308 is connected to an external storage device. The components 301 to 308 are connected by a system bus 309 and data is exchanged between the components.

Figure 4:
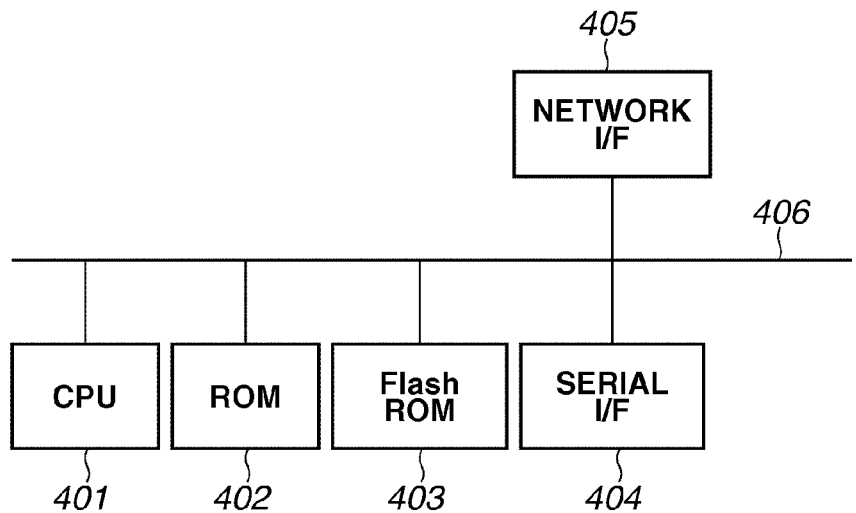
FIG. 4 is a block diagram illustrating an example of a hardware configuration of the monitoring apparatus of a different configuration.

FIG. 4 is a block diagram illustrating an example of a different hardware configuration of each of the monitoring apparatuses 117, 122, and 123. In FIG. 4, a CPU 401 performs processing of the monitoring apparatus. A ROM 402, which is not rewritable, stores programs and data related to the processing of the apparatus. A flash ROM 403 stores data related to the processing of the monitoring apparatus, temporary data, information related to the image forming apparatuses which are the monitoring targets, and information collected from the image forming apparatuses.

A serial I/F 404 outputs an error or a log from a program that runs on the monitoring apparatus. The serial I/F 404 may be connected to a terminal by a serial cable. A network I/F 405 is connected to a LAN and the Internet via a network and exchanges information with an external device. The components 401 to 405 are connected by a system bus 406 and data is exchanged between the components.

Figure 5:
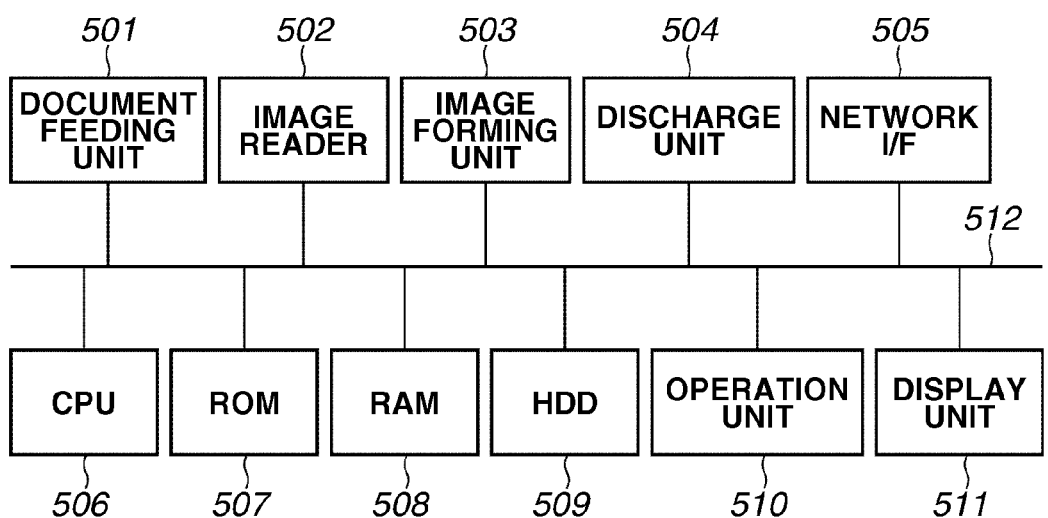
FIG. 5 is a block diagram illustrating an example of a hardware configuration of an image forming apparatus.

FIG. 5 is a block diagram illustrating an example of a hardware configuration of the image forming apparatuses 115, 116, 120, 121, 124, 125, 126, 127, and 131. The image forming apparatuses are apparatuses such as a multifunction peripheral having printing and facsimile functions, a printer that receives data from a PC or the like and prints the received data according to electrophotography, ink jet technique, or a sublimation method, a scanner, and a fax machine. FIG. 5 illustrates a hardware configuration of a multifunction peripheral as an example of the image forming apparatus.

In FIG. 5, a document feeding unit 501 feeds a document set on a document positioning plate to an image reader 502. The image reader 502 scans image data of a document fed from the document feeding unit 501. An image forming unit 503 converts data which the image reader 502 has obtained by scanning the document and data received via the network into a print image, and prints the image on paper.

A discharge unit 504 discharges the paper which has been printed by the image forming unit 503 and performs processing such as sorting and stapling. The network I/F 505 is connected to a LAN and the Internet via a network and exchanges information with an external device.

A CPU 506 performs processing of the image forming apparatus. The CPU 506 monitors an operation state of the image forming apparatus and controls the image forming apparatus such that if a specific event such as a failure occurs, state information that indicates the operation state is transmitted to a destination determined in advance. The destination is, for example, the monitoring center host computer 111 or a monitoring apparatus.

A ROM 507 is a non-volatile storage device that stores programs and data related to the processing of the image forming apparatus. A RAM 508 is rewritable and may electrically store temporary data related to the processing of the apparatus. A HDD 509 stores programs and data related to the processing of the image forming apparatus, temporary data, and user data transmitted to the image forming apparatus.

An operation unit 510 accepts instructions input directed to the image forming apparatus. A display unit 511 displays an operation state of the apparatus and information related to the operation of the operation unit 510. These components 501 to 511 are connected by a system bus 512 and data is exchanged between the components.

Regarding the image forming apparatus 131 (see FIG. 1), which has a function that allows active transmission of information used for monitoring, programs and data related to the transmission of the monitoring data are stored in the ROM 507 or the HDD 509.

Figure 6:
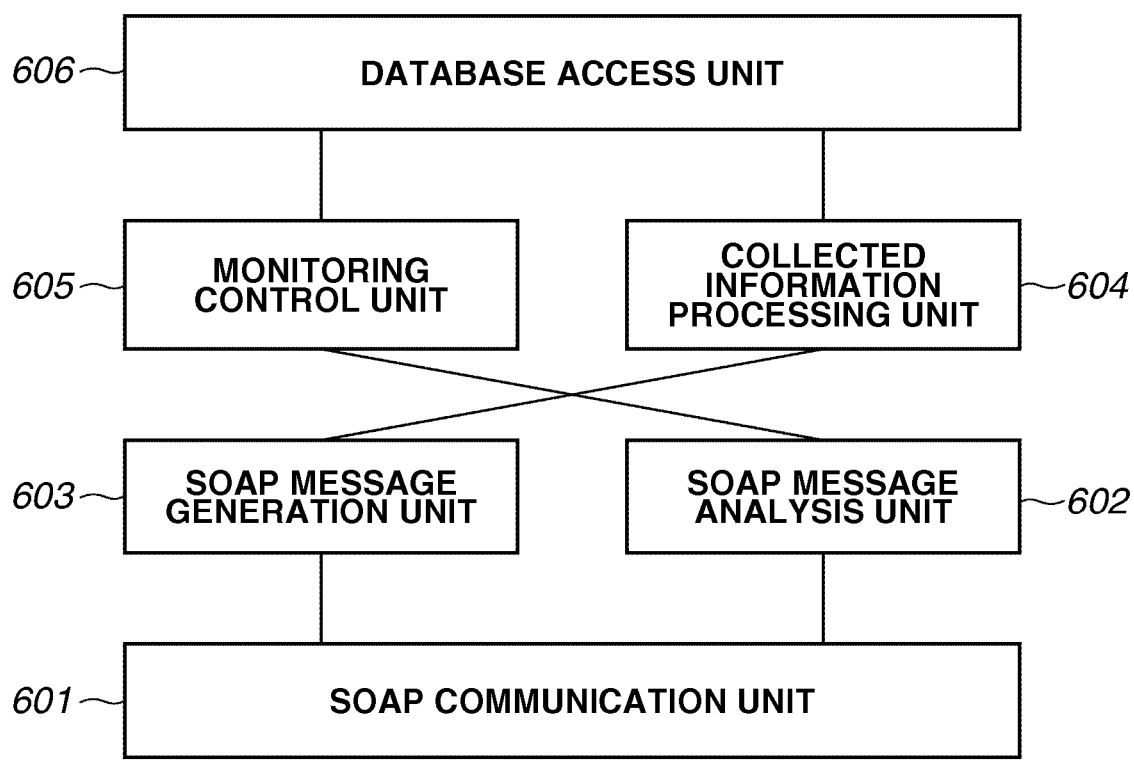
FIG. 6 is a block diagram illustrating an example of a software configuration of a portion related to an image forming apparatus management system of the monitoring center host computer and a delivery server.

FIG. 6 is a block diagram illustrating an example of a software configuration of a portion related to the image forming apparatus management system of the monitoring center host computer 111 and the delivery server 133.

In FIG. 6, a SOAP communication unit 601 transmits SOAP data sent from the monitoring apparatus 117, 122, or 123 or the image forming apparatus 131 to a SOAP message analysis unit 602 via the network I/F 209. The SOAP message analysis unit 602 analyzes the SOAP data sent from the SOAP communication unit 601. Further, the SOAP communication unit 601 transmits the SOAP data generated by a SOAP message generation unit 603 to the monitoring apparatus 117, 122, or 123 or the image forming apparatus 131 via the network I/F 209.

A collected information processing unit 604 stores the information which has been transmitted from the monitoring apparatus 117, 122, or 123 or the image forming apparatus 131 in the database 112 or the database 134 via a database access unit 606. The collected information processing unit 604 stores the information in the database as it is or after processing the information. Further, the collected information processing unit 604 realizes a function related to remote monitoring system. For example, the collected information processing unit 604 gives notification regarding aggregate calculation of counter information, error information, firmware latest information to a service person in charge or an administrator on the customer's side. Such information is based on the information transmitted from the monitoring apparatus 117, 122, or 123, or the image forming apparatus 131, which is being monitored, or data stored in the database 112 or the database 134.

A monitoring control unit 605 performs schedule management regarding the acquisition of the information of the monitoring apparatus 117, 122, or 123, or the image forming apparatus 131, or control of monitoring contents, and a monitoring method. Further, the monitoring control unit 605 transmits an instruction to the monitoring apparatus 117, 122, or 123, or the image forming apparatus 131, which is being monitored, via the SOAP message generation unit 603, the SOAP communication unit 601, and the network I/F 209 as needed.

The above-described units 601 to 606 correspond to the functions which are realized when the first CPU 201 or the second CPU 202 of the monitoring center host computer 111 or of the delivery server 133 loads a computer-readable program recorded in a recording medium such as the first HDD 205 or the second HDD 206 onto the RAM 204 and executes the program. If the area of the RAM 204 becomes too small, the first HDD 205 or the second HDD 206 may be used as a part of the area of the RAM 204.

Figure 7:
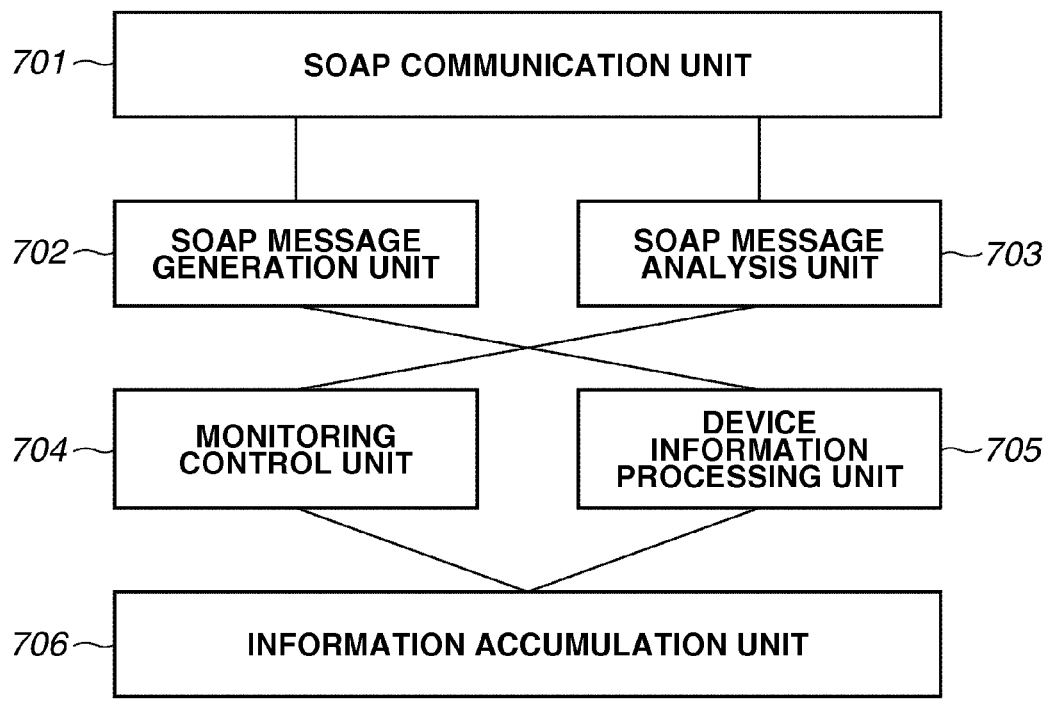
FIG. 7 is a block diagram illustrating an example of a software configuration of a portion of the monitoring apparatus related to the image forming apparatus monitoring system.

FIG. 7 is a block diagram illustrating an example of a software configuration of a portion related to the image forming apparatus monitoring system of the monitoring apparatuses 117, 122, and 123. In FIG. 7, a SOAP communication unit 701 transmits the SOAP data sent from the monitoring center host computer 111 via the network I/F 307 or 405 to a SOAP message analysis unit 703. Further, the SOAP communication unit 701 transmits the SOAP data generated by a SOAP message generation unit 702 to the monitoring center host computer 111 or the delivery server 133 via the network I/F 307 or 405.

The SOAP message analysis unit 703 analyzes the SOAP data sent from the monitoring center host computer 111. Based on the monitor settings of the monitoring center host computer 111, a monitoring control unit 704 updates information of the monitored image forming apparatus stored in an information accumulation unit, acquires information of the image forming apparatus 115 or 116, and performs schedule management.

A device information processing unit 705 accumulates counter information, service call information, paper jam information, and toner-out information in an information accumulation unit 706. Such information is actively collected by the monitoring apparatus from the image forming apparatus 115 or 116. The information is collected according to the schedule managed by the monitoring control unit 704. Alternatively, the accumulation of information is performed according to a state of the image forming apparatus 115 or 116.

The data accumulated in the information accumulation unit 706 is sent to the SOAP message generation unit 702 as it is via the device information processing unit 705, and then transmitted to the monitoring center host computer 111. Alternatively, the data accumulated in the information accumulation unit 706 is interpreted and processed by the device information processing unit 705, sent to the SOAP message generation unit 702, and then transmitted to the monitoring center host computer 111.

The above-described units 701 to 706 correspond to the functions which are realized when the CPU 301 of the monitoring apparatus 117, 122, or 123 loads a computer-readable program recorded in a recording medium such as the first HDD 304 or the RAM 303 and executes the program. If the area of the RAM 303 becomes too small, the HDD 304 may be used as a part of the area of the RAM 303.

Figure 8:
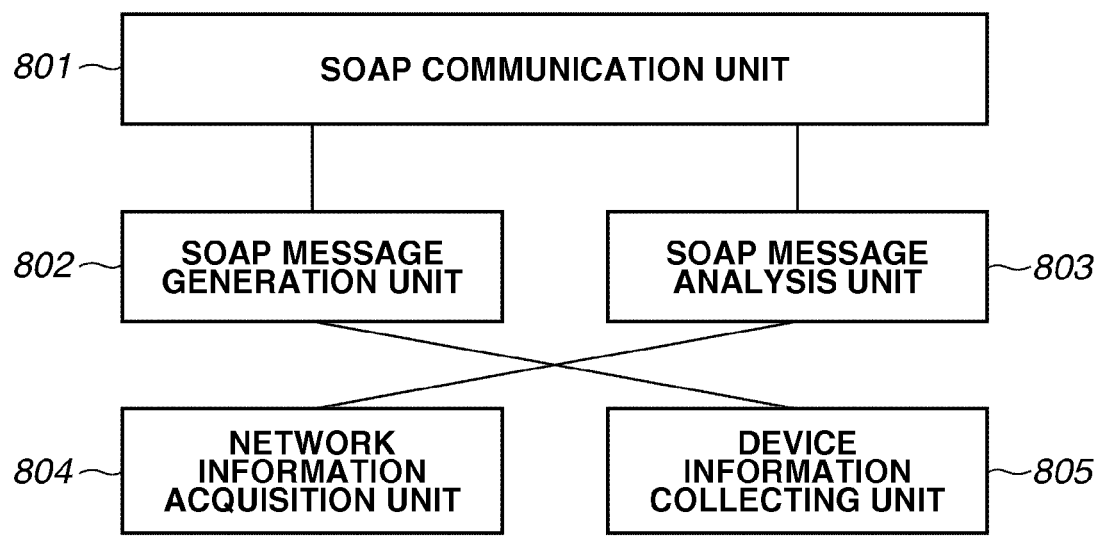
FIG. 8 is a block diagram illustrating an example of a software configuration of a portion of each image forming apparatus related to the image forming apparatus management system.

FIG. 8 is a block diagram illustrating an example of a software configuration of a portion related to the image forming apparatuses 115 and 116, 120, 121, 124, 125, 126, 127, and 131 of the image forming apparatus management system.

In FIG. 8, a SOAP communication unit 801 transmits the SOAP data sent from the monitoring center host computer 111 or the delivery server 133 via the network I/F 505 to a SOAP message analysis unit 803. Further, the SOAP communication unit 801 transmits the SOAP data generated by a SOAP message generation unit 802 to the monitoring center host computer 111 or the delivery server 133 via the network I/F 505. The SOAP message analysis unit 803 analyzes the SOAP data sent from the SOAP communication unit 801.

A network information acquisition unit 804 may automatically acquire an IP address, a domain name system (DNS) server address, and a gateway address in a Dynamic Host Configuration Protocol (DHCP) environment. Further, if network information is input via the operation unit 510 and stored in the HDD 509, the network information acquisition unit 804 acquires the information.

A device information collecting unit 805 acquires the counter information stored within the apparatus according to a schedule of the multifunction peripheral or an instruction from the monitoring center host computer 111. Further, the device information collecting unit 805 acquires a service call and information such as paper jam and toner-out information which occur within the apparatus. The acquired data is sent to the SOAP message generation unit 802 as it is and then transmitted to the monitoring center host computer 111. Alternatively, the acquired data is sent to the SOAP message generation unit 802 after being accumulated, interpreted, and processed by the device information collecting unit 805, and then transmitted to the monitoring center host computer 111.

Figure 9:
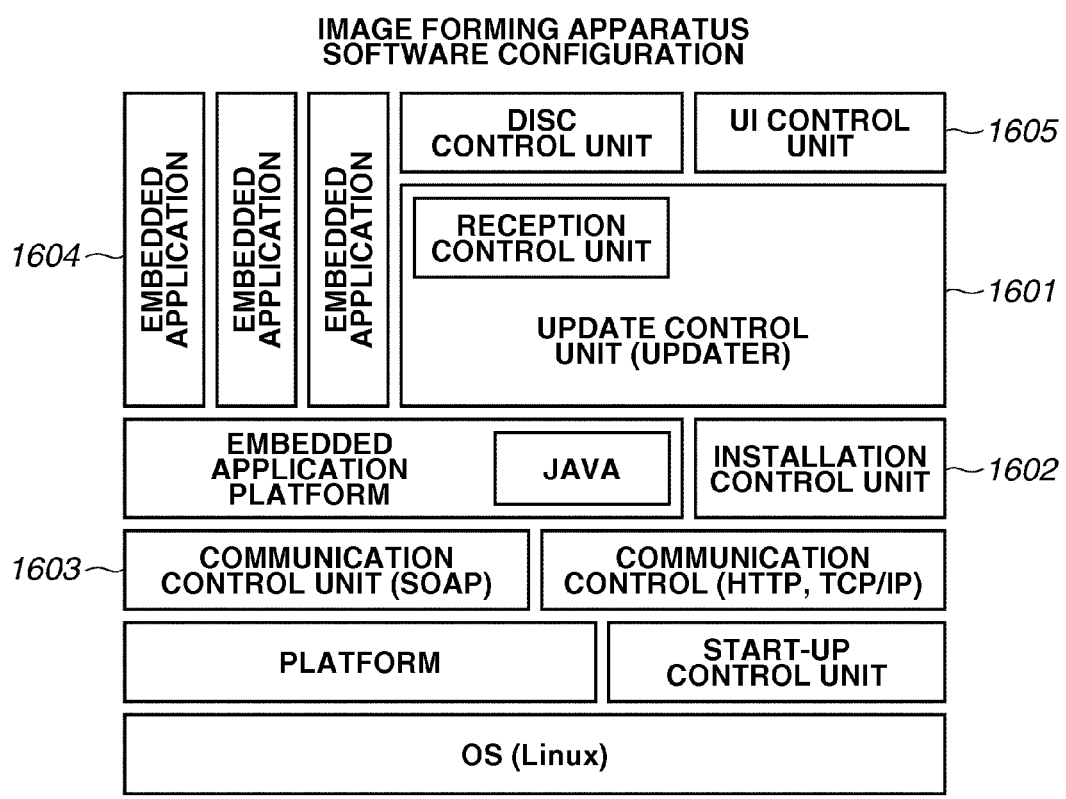
FIG. 9 is a conceptual drawing of an example of a software configuration of each image forming apparatus.

FIG. 9 is a block diagram illustrating an example of a software configuration of the image forming apparatuses 115, 116, 120, 121, 124, 125, 126, 127, and 131. In FIG. 9, an updater, or update control unit, module, or apparatus 1601 executes processing described below with reference to FIGS. 12, 13, and 14. An installation control unit 1602 executes installation processing and actually applies the firmware which has been downloaded from the delivery server 133 to the image forming apparatus. The updater or update control unit 1601 and/or the installation control unit 1602 may be part of or separated from the image forming apparatus software. In addition, the updater or update control unit 1601 and/or the installation control unit 1602 may be implemented by hardware, software, or firmware, or any combination thereof.

A UI control unit 1605 displays an operation state of the image forming apparatus or an operation screen and accepts input of instructions for the image forming apparatus. For example, the UI control unit 1605 displays a UI screen described below with reference to FIG. 11 and accepts settings regarding periodic update given by the user.

A communication control unit (SOAP) 1603 controls the communication using SOAP. The SOAP communication unit 801, the SOAP message generation unit 802, the SOAP message analysis unit 803, and the network information acquisition unit 804 illustrated in FIG. 8 are included in the communication control unit (SOAP) 1603. However, the network information acquisition unit 804 may also be included in a communication control unit (HTTP, TCP/IP) or an operating system (OS).

Further, the device information collecting unit 805 illustrated in FIG. 8 corresponds to an embedded application 1604.

Each of the units in the above-described FIG. 9 (including the units 801 to 805 in FIG. 8), corresponds to the function which is realized when the CPU 506 of the image forming apparatuses 115, 116, 120, 121, 124, 125, 126, 127, and 131 loads a computer-readable program recorded in a recording medium such as the ROM 507 or the HDD 509 onto the RAM 508 and executes the program. If the area of the RAM 508 becomes too small, the HDD 509 may be used as a part of the RAM 508.

Next, processing of an image forming apparatus firmware transmission system will be described with reference to FIGS. 10 to 16. First, a general flow of the present invention regarding the image forming apparatus 124 or the like, the delivery server 133, and the monitoring center host computer 111 will be described with reference to FIG. 10.

Figure 10:
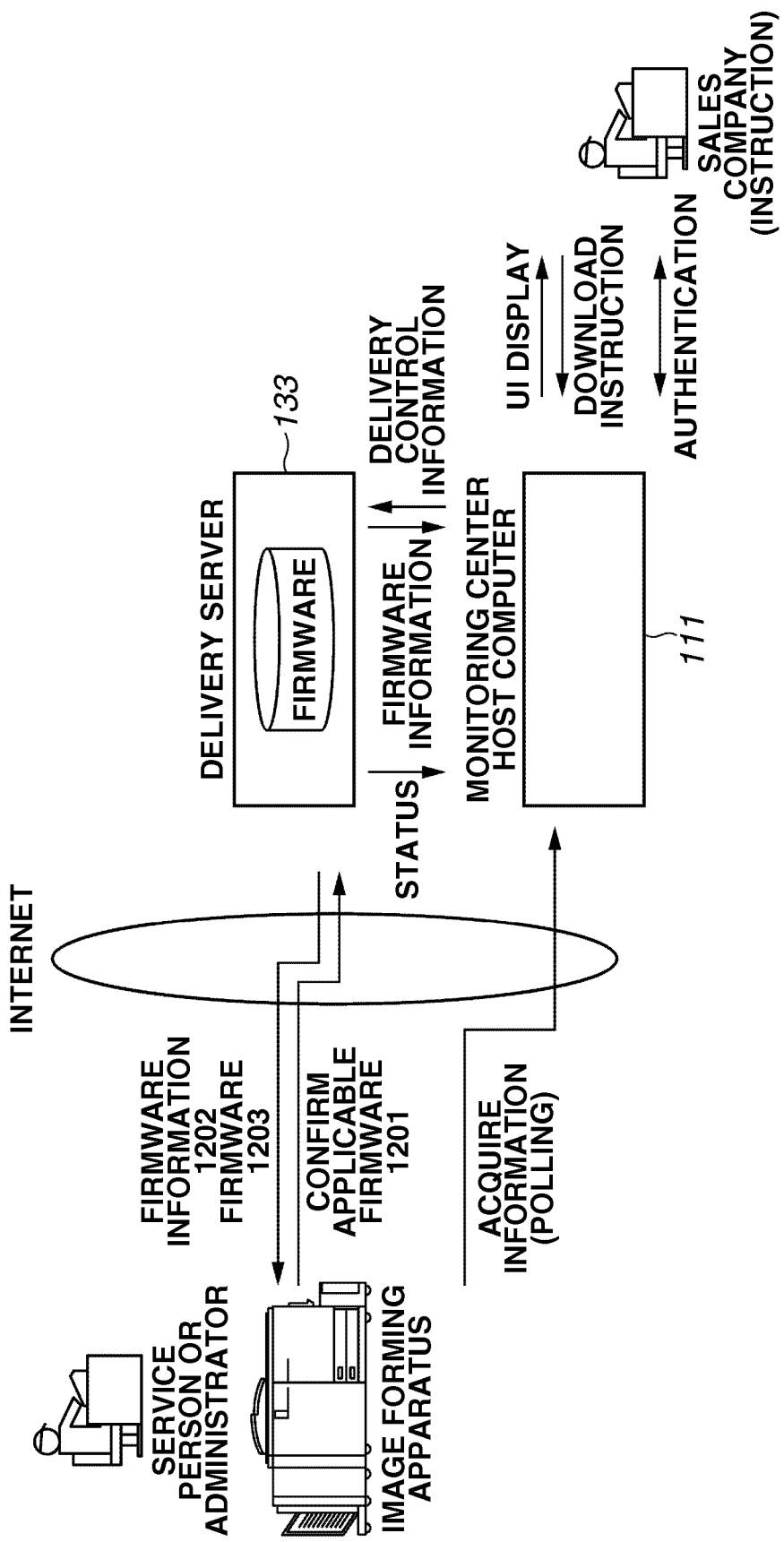
FIG. 10 illustrates overall flow of processing of the delivery server, the monitoring center host computer, and the image forming apparatus.

FIG. 10 illustrates a general flow of the processing between the delivery server 133, the monitoring center host computer 111, and the image forming apparatus 124. According to the hardware and software configurations described above, information communication is performed between the delivery server 133, the monitoring center host computer 111, and the image forming apparatus, and the firmware delivery is performed.

The firmware is delivered from the delivery server 133 to the image forming apparatus according to an instruction given by the monitoring center host computer 111 or by a service person or an administrator actually giving an instruction at the site of the image forming apparatus. However, the settings of the periodic update are set from the image forming apparatus. Next, how the settings of the periodic update are made will be described with reference to FIG. 11.

Figure 11:
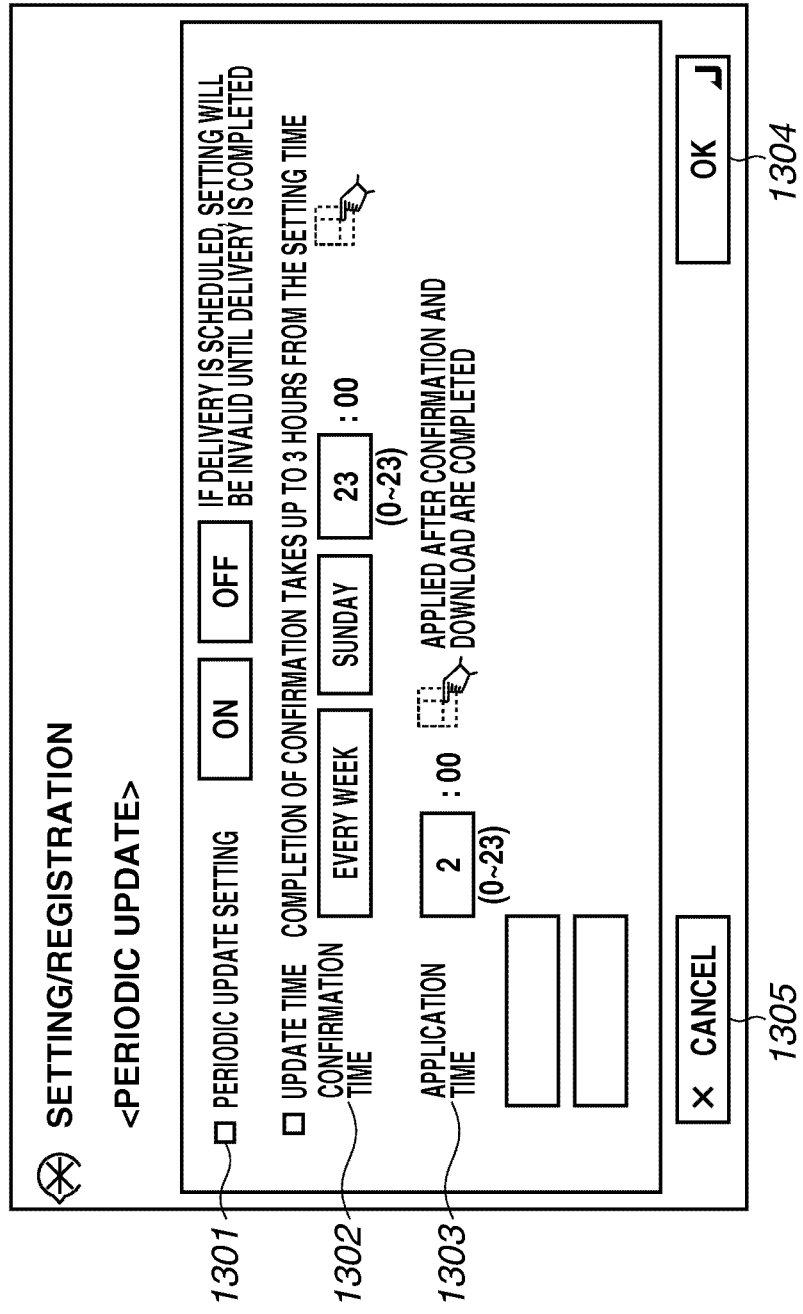
FIG. 11 illustrates an example of a periodic update setting screen displayed on a display unit according to an instruction given by a user interface (UI) control unit of the image forming apparatus.

FIG. 11 illustrates an example of a periodic update setting screen (a user interface (UI) for making the periodic update setting) displayed on the display unit 511 according to the UI control unit 1605 of the image forming apparatus.

In FIG. 11, periodic update ON/OFF setting 1301 is set to "ON" if the periodic update is to be performed and "OFF" is set if the periodic update is not to be performed. Confirmation time 1302 is used for setting update confirmation time. The update confirmation time is the time the update confirmation processing is performed with respect to the delivery server 133. In other words, the update confirmation time is the time for confirming whether firmware applicable to the image forming apparatus is managed by the delivery server 133. A setting unit 1303 is used for setting update application time. The application time is the time the firmware downloaded from the delivery server 133 is applied to the image forming apparatus.

A cancel button 1305 is used for cancelling the periodic update setting set on the screen. On the other hand, the periodic update setting will be effective if an OK button 1304 is selected. If the OK button 1304 is selected, the setting is stored in the HDD 509 of the image forming apparatus. The periodic update is performed according to the content of the setting. The content of the setting will be described in detail below.

Referring back again to FIG. 10, when an actual confirmation time (time shifted from the above-described confirmation time) which will be described below comes, the image forming apparatus performs applicable firmware confirmation processing with respect to the delivery server 133 ("confirm applicable firmware 1201" in FIG. 10). This processing is performed so as to confirm whether the latest firmware is registered in the delivery server 133 and the firmware is in a deliverable state. According to this processing, SOAP data, such as the one described below with reference to FIG. 15, is transmitted from the image forming apparatus to the delivery server 133.

Figures 16, 17:
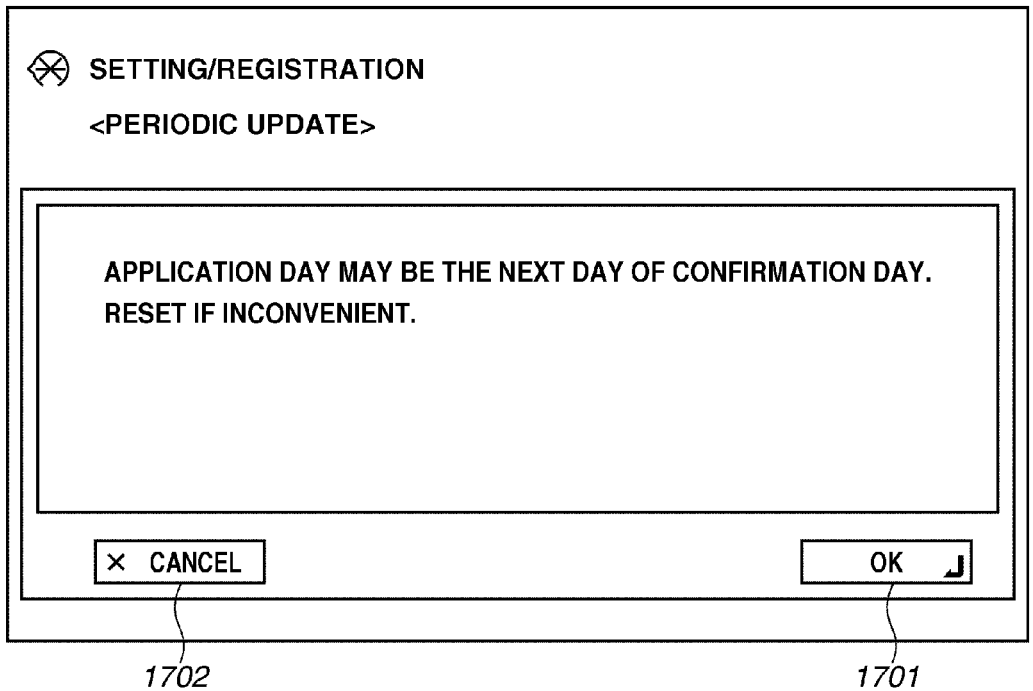
FIG. 16 illustrates an example of SOAP data transmitted from the delivery server to the image forming apparatus.
FIG. 17 illustrates an example of a user confirmation dialog according to one embodiment.

Then, if the applicable firmware is registered in the delivery server 133 and is in a deliverable state, SOAP data, such as the one described below with reference to FIG. 16, is transmitted from the delivery server 133 to the image forming apparatus ("firmware information 1202" in FIG. 10). After then, the firmware is downloaded from the delivery server 133 to the image forming apparatus ("firmware 1203" in FIG. 10).

Figure 12:
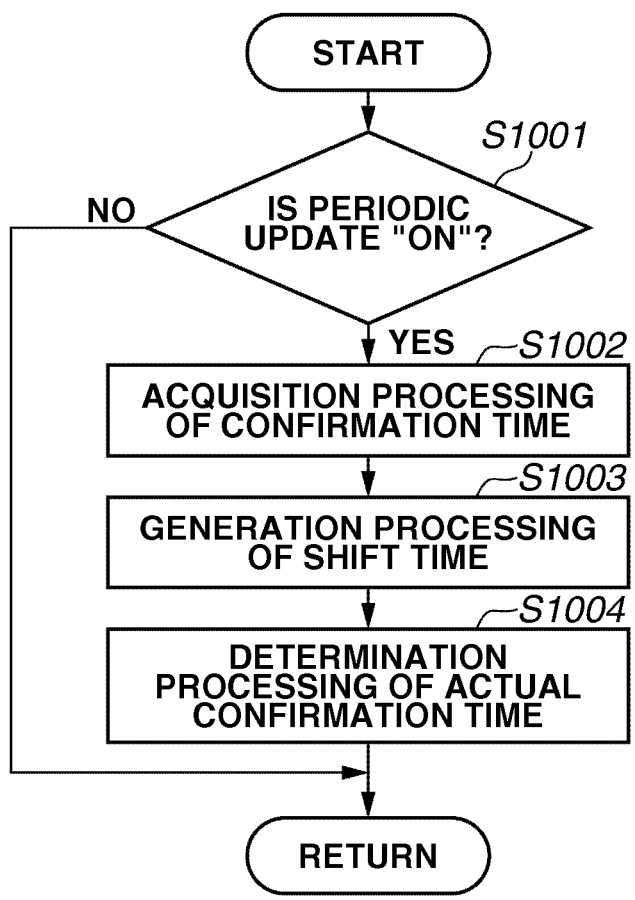
FIG. 12 is a flowchart illustrating an example of update processing according to one embodiment.
Figure 13:
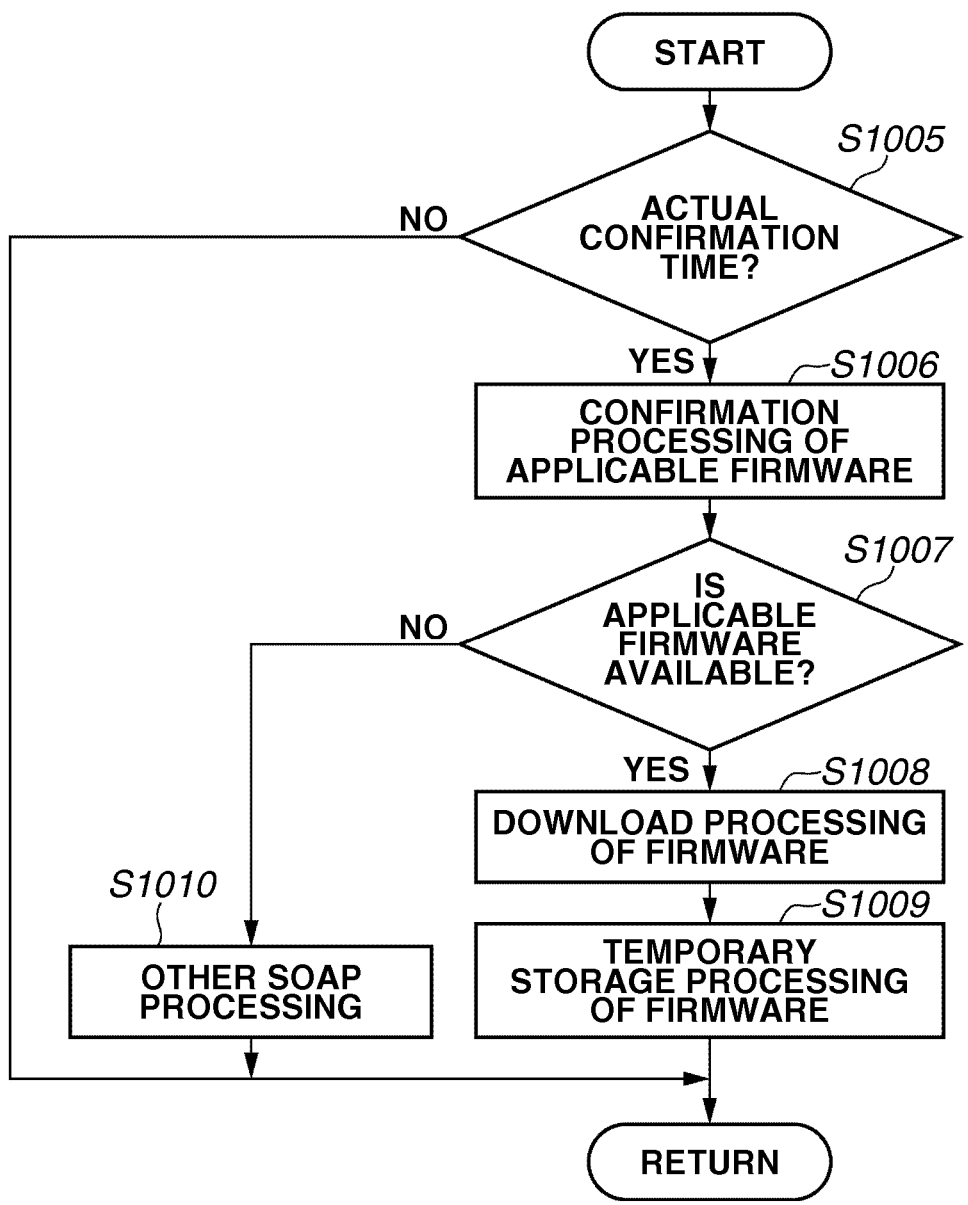
FIG. 13 is a flowchart illustrating an example of update processing according to one embodiment.

Next, the update processing of firmware will be described with reference to FIGS. 12 to 14. FIGS. 12 to 14 are flowcharts illustrating an example of update processing of the present invention. Processing of these flowcharts is executed by the update control unit 1601 of each of the image forming apparatuses 115, 116, 120, 121, 124, 125, 126, 127, and 131. In other words, the update processing is realized by the CPU 506 of the image forming apparatuses 115, 116, 120, 121, 124, 125, 126, 127, and 131 downloading a computer-readable program stored in a recording medium such as the ROM 507 or the HDD 509 onto the RAM 508 and executing it.

In operation S1001 in FIG. 12, the update control unit 1601 performs processing for determining whether the periodic update setting is "ON". According to this processing, whether the periodic update function is effective (i.e., whether the periodic update of the periodic update ON/OFF setting 1301 is "ON" in FIG. 11) is determined.

When a service person or an administrator changes the periodic update function to the effective state, the setting of the periodic update ON/OFF setting 1301 on the periodic update setting screen illustrated in FIG. 11 is changed to "ON". Further, the confirmation time 1302 is set to "every week", "Sunday", "23:00", and the update application time 1303 is set to "2:00". The setting information is stored in the HDD 509 of the image forming apparatus. In operation S1001, if the update control unit 1601 determines that the periodic update is "OFF" (NO in operation S1001), then the processing ends. On the other hand, if the update control unit 1601 determines that the periodic update is "ON" (YES in operation S1001), the processing proceeds to operation S1002.

In operation S1002, the update control unit 1601 executes acquisition processing of the confirmation time. According to this processing, the confirmation time 1302 is acquired from the content of the setting set in the periodic update setting screen in FIG. 11. Here, as described above, "every week", "Sunday", and "23:00" are acquired as the confirmation time 1302 in FIG. 11.

In operation S1003, the update control unit 1601 executes generation processing of shift time. The amount of shift time which is generated according to this processing is added to the confirmation time 1302 so that the actual confirmation time is obtained.

The generation processing is started by the update control unit 1601 acquiring the current time. Then, the update control unit 1601 divides the current state into two cases (1) and (2) described below, and obtains a shiftable time. In the example described below, the upper limit of the shift time is set to "3 hours".

(1) If the current time is out of the range of "the confirmation time+3 hours", the shiftable time will be the time from the confirmation time to the upper limit of the shiftable time of the day (confirmation time+3 hours)

(2) If the current time is within "the confirmation time+3 hours", the shiftable time will be the time from the current time to the upper limit of the shiftable time of the day (confirmation time+3 hours) within the range of the time For example, a case where the confirmation time is 14:00 and the current time is 12:00, corresponds to the case (1), and the shiftable time will be from 14:00 to 17:00 (3 hours). Further, a case where the current time is 15:00, corresponds to the case (2), and the shiftable time will be from 15:00 to 17:00 (2 hours).

Then, the update control unit 1601 acquires a random time within the shiftable time by using, for example, random class (e.g., random number). For example, in the former example corresponding to the case (1), a random time (time of day) within the period from 14:00 to 17:00 (3 hours) is calculated. In the latter example corresponding to the case (2), a random time (time of day) within the period from 15:00 to 17:00 (2 hours) is calculated. The random time within the shiftable time may be acquired according to any method.

If the current time is "12:00, August 1st (Sunday), 2010" and the confirmation time is "23:00, Sunday", the case corresponds to the case (1). Thus, a random time within 3 hours is set. For example, a shift time value of "2 hours 30 minutes" will be generated. Although the upper limit of the shift time is set to "3 hours" in the description below, the upper limit is not limited to such a value. In other words, the update control unit 1601 generates a random time which does not exceed the upper limit of the predetermined range of shift (predetermined shift range) as a shift time value.

Referring back again to FIG. 12, in operation S1004, the update control unit 1601 executes determination processing of an actual confirmation time. According to this processing, the actual confirmation time is determined by using the confirmation time which has been acquired by the confirmation time acquisition processing in operation S1002 and the shift time value which has been generated by the generation processing of the amount of shift time in operation S1003. Since the confirmation time is "23:00" and the shift time value is "2 hours 30 minutes" the actual confirmation will be performed on the next day, "1:30, Aug. 2, 2010 (Monday)". In other words, in steps S1001 to S1003, the update control unit 1601 sets the time of day obtained by randomly shifting the confirmation time within a predetermined shift range as the actual confirmation time.

FIG. 13 is a flowchart illustrating determination processing of the actual confirmation time performed by the update control unit 1601. According to this determination processing, whether the current time is the actual confirmation time, which has been determined in advance, may be determined.

In operation S1005, the update control unit 1601 determines whether the current time has reached the actual confirmation time. If the update control unit 1601 determines that the current time has not yet reached the actual confirmation time (NO in operation S1005), then the processing ends. On the other hand, if the update control unit 1601 determines that the current time has reached the actual confirmation time (YES in operation S1005), the processing proceeds to operation S1006.

In operation S1006, the update control unit 1601 executes confirmation processing of firmware which is applicable. According to this confirmation processing, whether the latest firmware is registered in the delivery server 133 and whether the firmware is in a deliverable state (managed in a deliverable state) is confirmed. Further, according to this processing, SOAP data as the one described in FIG. 15 is transmitted to the delivery server 133.

FIG. 15 illustrates an example of the SOAP data transmitted to the delivery server 133 from the image forming apparatus. A current firmware component information list illustrated in FIG. 15 shows a firmware configuration of the image forming apparatus and the version of each configuration. The list is used for the calculation of the latest applicable firmware performed by the delivery server 133.

The latest firmware information that matches the configuration of the image forming apparatus is calculated by the delivery server 133 based on such data, and the obtained information is transmitted to the image forming apparatus as in the form of SOAP data illustrated in FIG. 16.

FIG. 16 illustrates an example of the SOAP data transmitted from the delivery server 133 to the image forming apparatus. Firmware group version illustrated in FIG. 16 is the version attached to the firmware configuration as a whole, and the latest firmware managed by the delivery server 133 is presented. The presented firmware is downloaded according to the firmware download processing described below with reference to operation S1008.

In operation S1007 in FIG. 13, the update control unit 1601 receives the SOAP data illustrated in FIG. 16 sent from the delivery server 133 and determines whether applicable firmware exists (whether applicable firmware is managed by the delivery server 133) by using the received SOAP data. In other words, the update control unit 1601 compares the version of the firmware which is applied to the image forming apparatus and the version of the firmware (firmware group version) presented in the received SOAP data.

If the version of the firmware presented in the received SOAP data is newer, the update control unit 1601 determines that applicable firmware exists (the firmware is managed in a deliverable manner by the delivery server 133). On the other hand, if the version of the firmware presented in the received SOAP data is older or equal to the version of the firmware currently applied to the image forming apparatus, the update control unit 1601 determines that applicable firmware does not exist (not managed by the delivery server 133).

In operation S1007, if the update control unit 1601 determines that an applicable firmware does not exist (not managed by the delivery server 133) (NO in operation S1007), the processing proceeds to operation S1010. In operation S1010, the update control unit 1601 executes other SOAP processing. Then, the processing ends.

On the other hand, in operation S1007, if the update control unit 1601 determines that applicable firmware exists (managed by the delivery server 133) (YES in operation S1007), the processing proceeds to operation S1008.

In operation S1008, the update control unit 1601 executes download processing of the firmware. According to this processing, the update control unit 1601 designates the delivery server 133 or a server almost equivalent to the delivery server 133 and instructs the designated server to sequentially download the necessary firmware configuration (firmware that corresponds to the firmware group version in FIG. 16).

In operation S1009, the update control unit 1601 temporary stores the downloaded firmware, and then the processing ends. According to this temporary storage processing, the firmware acquired by the firmware download processing in operation S1008 is stored in the HDD 509.

Next, update of the firmware stored in the image forming apparatus will be described with reference to FIG. 14. At this point, as illustrated in FIG. 11, the periodic update setting is set, and according to the operations described with reference to FIGS. 12 and 13, the firmware is stored in the HDD 509 of the image forming apparatus.

In operation S1101 in FIG. 14, the update control unit 1601 executes determination processing and determines whether download-completed firmware exists. This processing is performed so as to determine whether download-completed firmware stored in the HDD 509 in operation S1009 in FIG. 13 exists. If the update control unit 1601 determines that such download-completed firmware does not exist (NO in operation S1101), then the processing ends.

On the other hand, if the update control unit 1601 determines that such download-completed firmware exists (YES in operation S1101), the processing proceeds to operation S1102. In operation S1102, the update control unit 1601 executes acquisition processing of the application time. According to this processing, the update application time 1303 set from the periodic update setting screen illustrated in FIG. 11 and stored in the HDD 509 is acquired. In the following description, "2:00" is acquired as the update application time 1303 as described above.

In operation S1103, the update control unit 1601 executes processing for determining whether the current time has reached the application time. This processing is performed to determine whether the current time has reached the application time acquired in operation S1102.

If the update control unit 1601 determines that the current time has not yet reached the application time (NO in operation S1103), the processing proceeds to operation S1105. In operation S1105, the update control unit 1601 performs the normal processing, and then the processing ends.

On the other hand, if the update control unit 1601 determines that the current time has reached the application time (YES in operation S1103), the processing proceeds to operation S1104. In operation S1104, the update control unit 1601 executes the update processing, and then the processing ends. According to this processing, the installation control unit 1602 is instructed such that the firmware downloaded and stored in the HDD 509 is applied to the image forming apparatus and the firmware is updated. In this manner, the firmware of the image forming apparatus is updated.

According to the operations illustrated in FIGS. 12, 13, and 14, the delivery server 133 and the image forming apparatus cooperate and perform confirmation at regular intervals with a certain shift time, and the firmware may be updated at a designated time.

As described above, by making confirmation with a certain shift time from the confirmation time which has been set, an update time of the firmware confirmed to the delivery server by the image forming apparatus is distributed. Accordingly, concentration of the load on the delivery server may be prevented.

Further, since the update of the firmware is performed at an application time, which is set different from the confirmation time, the update may be performed at a time convenient for the user.

As described above, by uniformly making the time settings of a plurality of devices (image forming apparatuses) according to a simple and unified operation, the communication load of the server due to firmware update confirmation may be reduced. Further, since special adjustment is unnecessary on the device management side, the load concerning device management may be reduced.

As described above, the confirmation time presented on the periodic update setting screen, as the one illustrated in FIG. 11, includes a shift range. Since the actual application of the firmware is performed after the download of the firmware via the network is completed, the application may be performed on the next day. In such a case, a confirmation dialog is presented to the user. An example of such a dialog is illustrated in FIG. 17.

FIG. 17 illustrates an example of the user confirmation dialog according to the present invention. The dialog is displayed, for example, if the user selects the OK button on the periodic update setting screen in FIG. 11 and the UI control unit 1605 determines that the application may be performed on the next day of the day of confirmation. For example, the UI control unit 1605 determines that the application may be performed on the next day of the confirmation day if the time of the day, set as the update application time 1303, is out of the range of the time of the day set as the confirmation time 1302, +3 hours+α (α indicates the download time which is set in advance).

If an OK button 1701 is pressed on the screen in FIG. 17, the UI control unit 1605 determines that the setting on the periodic update setting screen (see FIG. 11) is effective, and stores the setting in the HDD 509 of the image forming apparatus.

On the other hand, if a cancel button 1702 is pressed on the screen in FIG. 17, the UI control unit 1605 changes the screen back to the periodic update setting screen (FIG. 11), which enables resetting. Further, according to the above-described exemplary embodiment, the upper limit of the shift time (shift range) of the confirmation time 1302 is set to "3 hours". However, the upper limit of the shift time of the confirmation time 1302 may also be set via the periodic update setting screen illustrated in FIG. 11.

Further, according to the above-described exemplary embodiment, the actual confirmation time is the time of the day obtained by randomly moving back the confirmation time 1302. However, the confirmation time 1302 may be randomly moved forward or back within the upper limit of the shift time in determining the actual confirmation time.

Figure 18:
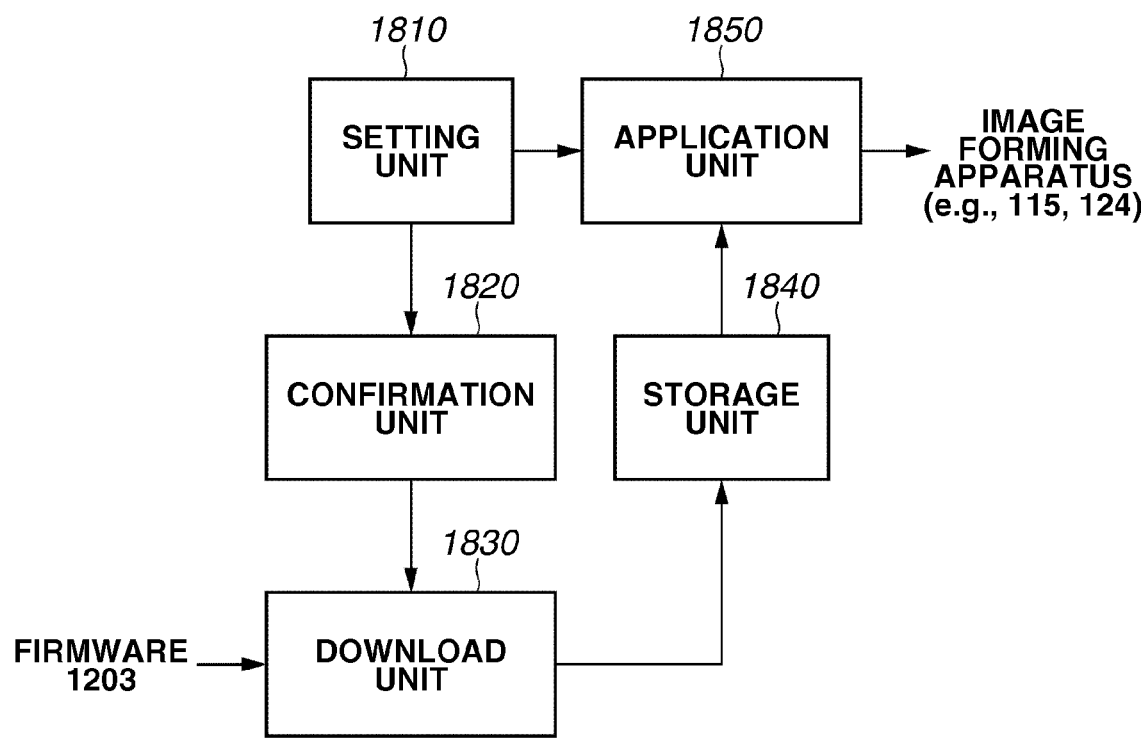
FIG. 18 illustrates an example of an image forming apparatus having an updater or update control unit according to one embodiment.

FIG. 18 illustrates an example of an image forming apparatus having the updater or the update control unit, module, or apparatus 1601 according to one embodiment. The updater 1601 may include a setting unit 1810, a confirmation unit 1820, a download unit 1830, a storage unit 1840, and an application unit 1850. The updater 1601 may include more or less than the above components. In addition, any of the above components may be implemented by hardware, software, firmware, or any combination thereof.

The setting unit 1810 may be configured to set a confirmation time at which processing for confirming whether firmware 1203 applicable to the image forming apparatus (e.g., image forming apparatus 115, 124, 131) is managed by the server and an application time at which the firmware 1203 is applied to the image forming apparatus. The setting unit 1810 may set a predetermined range. It may also make a setting of the confirmation time of the image forming apparatus and a plurality of other image forming apparatuses which the image forming apparatus communicates with.

The confirmation unit 1820 may be configured to perform the confirmation processing at an actual confirmation time shifted from the confirmation time which has been set. The confirmation unit 1820 may set a time of day randomly shifted, or within a predetermined range, from the confirmation time as the actual confirmation time. The confirmation unit 1820 may transmit a configuration of the firmware 1203 of the image forming apparatus to the server. It may receive information of a latest firmware corresponding to the configuration of the firmware 1203 from the server. It may compare the information of the latest firmware which has been received and information of the firmware applied to the image forming apparatus. It may confirm whether firmware applicable to the image forming apparatus is in the server.

The download unit 1830 may be configured to, if the confirmation unit 1820 confirms that the firmware 1203 is managed by the server, download the applicable firmware 1203; The storage unit 1840 may be configured to store the firmware 1203 downloaded by the download unit 1830. The application unit 1850 may be configured to apply the firmware 1203 stored in the storage unit 1840 to the image forming apparatus at the application time which has been set.

According to the above-described exemplary embodiment, firmware of an image forming apparatus has been updated. However, the updating of firmware of the present invention is not limited to updating of firmware of image forming apparatuses and may be applied to any electronic apparatus (information processing apparatus) so long as it has a function that allows communication with a delivery server. For example, the present invention may be applied to firmware updating of a personal computer as well as a mobile terminal such as a cellular phone, a smartphone, and a tablet-type terminal.

Further, according to the above-described exemplary embodiment, the setting made on the periodic update setting screen (FIG. 11) displayed on the operation unit 510 of the image forming apparatus is applied to the image forming apparatus (stored in the HDD 509 of the image forming apparatus). However, the management system may be configured such that the setting which has been made on the periodic update setting screen (see FIG. 11) displayed on the operation unit 510 of the image forming apparatus may be collectively applied not only to the image forming apparatus but also to a plurality of other image forming apparatuses which may communicate with the image forming apparatus. If the management system includes such a configuration, other image forming apparatuses to which the periodic update setting is to be applied need to be registered in advance.

Further, the management system may be configured such that the periodic update setting screen (FIG. 11) is displayed on a display device of a personal computer or the like, and the periodic update setting is collectively applied to a plurality of image forming apparatuses.

Furthermore, the management system may be configured such that the periodic update setting is collectively applied to a plurality of image forming apparatuses by using a periodic update setting file (CSV file including settings set via the periodic update setting screen) stored in a HDD of the personal computer.

Configurations of the above-described various types of data and the content of the data are not limited to the configurations described above, and may take various configurations and content depending on the application and the purpose.

The above-described exemplary embodiments may be also realized with, for example, a system, an apparatus, a method, a program, or a storage medium. More specifically, the above-described exemplary embodiments may be applied to a system including a plurality of devices or an apparatus including a single device. Further, a combination of the configurations of the above-described exemplary embodiments is also included in the present invention.

Further, the above-described exemplary embodiments may also be achieved by supplying a software program or instructions that realizes each function of the aforementioned exemplary embodiments to a system or an apparatus via a network or various types of storage media, and a computer (or a central processing unit (CPU) or a microprocessor unit (MPU)) in the system or the apparatus reads and executes the program or instructions stored in such storage media. Aspects of the present invention may be applied to a system including a plurality of devices, or to an apparatus including a single device.

Disclosed aspects of the embodiments may be realized by an apparatus, a machine, a method, a process, or an article of manufacture that includes a non-transitory storage medium having a program or instructions that, when executed by a machine or a processor, cause the machine or processor to perform operations as described above. The method may be a computerized method to perform the operations with the use of a computer, a machine, a processor, or a programmable device. The operations in the method involve physical objects or entities representing a machine or a particular apparatus (e.g., image forming apparatus, a server). In addition, the operations in the method transform the elements or parts from one state to another state. The transformation is particularized and focused on updating firmware. The transformation provides a different function or use such as storing the downloaded firmware, applying the stored firmware to the image forming apparatus, etc.

In addition, elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any optical, electromechanical, electromagnetic, or electronic devices. The term software generally refers to a logical structure, a method, a procedure, a program, a routine, a process, an algorithm, a formula, a function, an expression, etc. A software implementation typically includes realizing the above elements (e.g., logical structure, method, procedure, program) as instruction codes and/or data elements embedded in one or more storage devices and executable and/or accessible by a processor, a CPU/MPU, or a programmable device as discussed above. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations.

All or part of an embodiment may be implemented by various means depending on applications according to particular features, functions. These means may include hardware, software, or firmware, or any combination thereof. A hardware, software, or firmware element may have several modules or units coupled to one another. A hardware module/unit is coupled to another module/unit by mechanical, electrical, optical, electromagnetic or any physical connections. A software module/unit is coupled to another module by a function, procedure, method, subprogram, or subroutine call, a jump, a link, a parameter, variable, and argument passing, a function return, etc. A software module/unit is coupled to another module/unit to receive variables, parameters, arguments, pointers, etc. and/or to generate or pass results, updated variables, pointers, etc. A firmware module/unit is coupled to another module/unit by any combination of hardware and software coupling methods above. A hardware, software, or firmware module/unit may be coupled to any one of another hardware, software, or firmware module/unit. A module/unit may also be a software driver or interface to interact with the operating system running on the platform. A module/unit may also be a hardware driver to configure, set up, initialize, send and receive data to and from a hardware device. An apparatus may include any combination of hardware, software, and firmware modules/units.

The present invention is not limited to the above-described exemplary embodiments, and various changes and modifications may be applied so long as they fall within the scope of the present invention including an organic combination of the exemplary embodiments. Thus, a combination of configurations of the above-described exemplary embodiments and an alternate version of the embodiment are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-204069 filed Sep. 13, 2010, which is hereby incorporated by reference herein in its entirety.

What is claimed is:

1. An image forming apparatus which communicates with a server that controls delivery of firmware to a plurality of apparatuses, the image forming apparatus comprising:
 a setting unit configured to set a first setting for deciding a confirmation time at which processing for confirming whether firmware applicable to the image forming apparatus is managed by the server and a second setting for deciding an application time at which the firmware is applied to the image forming apparatus;
 a confirmation unit configured to perform the confirmation processing at an actual confirmation time shifted from a confirmation time decided according to the first setting;
 a download unit configured to, if the confirmation unit confirms that the applicable firmware is managed by the server, download the applicable firmware;
 a storage unit configured to store the firmware downloaded by the download unit; and
 an application unit configured to apply the firmware stored in the storage unit to the image forming apparatus at the application time decided according to the second setting,
 wherein, if the confirmation unit confirms that the applicable firmware is not managed by the server, a download of firmware is not performed.

2. The image forming apparatus according to claim 1, wherein the confirmation unit sets a time of day randomly shifted from the confirmation time decided according to the first setting as the actual confirmation time.

3. The image forming apparatus according to claim 1, wherein the confirmation unit sets a time of day randomly shifted within a predetermined range from the confirmation time decided according to the first setting as the actual confirmation time.

4. The image forming apparatus according to claim 1, wherein the setting unit sets a predetermined range.

5. The image forming apparatus according to claim 1, wherein the confirmation unit transmits a configuration of the firmware of the image forming apparatus to the server, receives information of a latest firmware corresponding to the configuration of the firmware from the server, compares the information of the latest firmware which has been received and information of the firmware applied to the image forming apparatus, and confirms whether firmware applicable to the image forming apparatus is in the server.

6. The image forming apparatus according to claim 1, wherein the setting unit makes a setting of the confirmation time of the image forming apparatus and a plurality of other image forming apparatuses which the image forming apparatus communicates with.

7. An update method of firmware for an image forming apparatus which communicates with a server that controls delivery of firmware to a plurality of apparatuses, the method comprising:

setting a first setting for deciding a confirmation time at which processing for confirming whether firmware applicable to the image forming apparatus is managed by the server and a second setting for deciding an application time at which firmware applicable to the image forming apparatus is applied to the image forming apparatus;
 performing the confirmation processing at an actual confirmation time shifted from a confirmation time decided according to the first setting;
 if management of firmware applicable to the image forming apparatus by the server is confirmed, downloading the applicable firmware to the image forming apparatus;
 storing the downloaded firmware; and
 applying the stored firmware to the image forming apparatus at the application time decided according to the second setting,
 wherein, if it is confirmed that the applicable firmware is not managed by the server, a download of firmware is not performed.

8. The update method according to claim 7, wherein a time of day randomly shifted from the confirmation time decided according to the first setting is set as the actual confirmation time in the confirmation processing.

9. The update method according to claim 7, wherein a time of day randomly shifted from the confirmation time decided according to the first setting within a predetermined range is set as the actual confirmation time in the confirmation processing.

10. The update method according to claim 7, wherein the predetermined shift range is set when setting is performed.

11. The update method according to claim 7, wherein in the confirmation processing a configuration of the firmware of the image forming apparatus is transmitted to the server, information of a latest firmware corresponding to the configuration of the firmware is received from the server, the information of the latest firmware which has been received and information of the firmware applied to the image forming apparatus are compared, and it is confirmed whether firmware applicable to the image forming apparatus is in the server.

12. The update method according to claim 7, wherein setting of the confirmation time of the image forming apparatus and a plurality of other image forming apparatuses which the image forming apparatus communicates with is made when setting is performed.

13. A non-transitory computer readable storage medium storing a program that, when executed by a machine or processor, causes the machine or processor to perform operations for communicating with a server system which controls distributing a firmware to a plurality of apparatuses, the operations comprising:
 setting a first setting for deciding a confirmation time at which processing for confirming whether firmware applicable to the image forming apparatus is managed by the server and a second setting for deciding an application time at which firmware applicable to the image forming apparatus is applied to the image forming apparatus;
 performing the confirmation processing at an actual confirmation time shifted from the confirmation time decided according to the first setting;
 if management of firmware applicable to the image forming apparatus by the server is confirmed, downloading the applicable firmware to the image forming apparatus;
 storing the downloaded firmware; and applying the stored firmware to the image forming apparatus at the application time decided according to the second setting, wherein, if it is confirmed that the applicable firmware is not managed by the server, a download of firmware is not performed.

* * * * *